US005773407A

United States Patent [19]
Lai et al.

[11] Patent Number: 5,773,407
[45] Date of Patent: Jun. 30, 1998

[54] ANTIFORM DELIVERY SYSTEM

[75] Inventors: Kuo-Tsai G. Lai; Wen P. Liao, both of Clifton Park; Frank J. Traver, Troy, all of N.Y.

[73] Assignee: General Electric Company, Waterford, N.Y.

[21] Appl. No.: 722,589

[22] Filed: Sep. 27, 1996

[51] Int. Cl.$^6$ .............................. C11D 17/00; C11D 3/38
[52] U.S. Cl. ......................... 510/466; 510/347; 510/349
[58] Field of Search ................................ 510/347, 349, 510/466

[56] References Cited

U.S. PATENT DOCUMENTS

| | | | |
|---|---|---|---|
| 3,779,942 | 12/1973 | Bolles | 252/316 |
| 4,690,713 | 9/1987 | Terae et al. | 106/287.16 |
| 4,818,292 | 4/1989 | Iley et al. | 106/210 |
| 4,824,593 | 4/1989 | Appel et al. | 252/127 |
| 4,906,396 | 3/1990 | Falholt et al. | 252/174.12 |
| 4,929,380 | 5/1990 | Schultz et al. | 252/121 |
| 4,962,165 | 10/1990 | Bortnick et al. | 525/479 |
| 4,978,471 | 12/1990 | Starch | 252/174.15 |
| 5,024,937 | 6/1991 | Penticoff et al. | 435/41 |
| 5,078,888 | 1/1992 | Penticoff et al. | 210/639 |
| 5,198,353 | 3/1993 | Hawkins et al. | 435/188 |
| 5,206,064 | 4/1993 | Scholtz | 428/86 |
| 5,391,316 | 2/1995 | Garrett et al. | 252/126 |
| 5,429,771 | 7/1995 | Fleuren et al. | 252/358 |
| 5,456,855 | 10/1995 | De Cupere | 252/174.15 |
| 5,505,875 | 4/1996 | Beaujean et al. | 252/186.27 |
| 5,648,327 | 7/1997 | Smerznak et al. | 510/340 |

FOREIGN PATENT DOCUMENTS 639730   4/1962   Canada ................................. 252/358

*Primary Examiner*—Mukund J. Shah
*Assistant Examiner*—Brenda Coleman
*Attorney, Agent, or Firm*—Kenneth S. Wheelock

[57] ABSTRACT

A method, composition and article of manufacture for an antifoam emulsion composition suitable for use in laundry detergents encapsulated by the reaction product of an alkylalkoxysilane and a silicone condensation cure catalyst.

20 Claims, No Drawings

ANTIFORM DELIVERY SYSTEM

FIELD OF THE INVENTION

The present invention relates to a means of delivering antifoam compositions whereby the antifoam composition is active both in the wash cycle of an automatic washing machine and a subsequent rinse cycle.

BACKGROUND OF THE INVENTION

Traditional laundry detergent antifoams are incorporated into detergents by emulsification of the antifoam using the surfactants present in the detergent or additional, external surfactants. While the antifoam particles are loosely protected from agglomeration and flocculation the emulsions comprising a detergent and an antifoam typically are thermodynamically unstable and the emulsions tend to settle out over time. Because of this settling out, the antifoam fraction of the emulsion tends to lose its effectiveness, particularly in the rinse cycle of automatic washing machines for home laundering. While a certain foaming or sudsing may be desirable in a laundry detergent, too much foaming clogs the draining of the wash water and complicates rinsing of the detergent from the clothes being washed.

BRIEF SUMMARY OF THE INVENTION

We now disclose a method of delivering antifoam compositions coupled with laundry detergents that enable a certain fraction of the antifoam composition to persist through the wash cycle to the rinse cycle, reducing the amount of foaming in the rinse cycle. Further this delivery system makes use of a new article of manufacture to make this method particularly effective.

Thus the present invention provides for a method for preparing an encapsulated antifoam composition comprising:
(a) preparing an aqueous emulsion comprising:
   (i) an antifoam composition and
   (ii) an alkylalkoxysilane; and
(b) adding to said aqueous emulsion a silicone condensation cure catalyst.

The present invention also provides an encapsulated antifoam composition comprising:
(a) an aqueous emulsion comprising
   an antifoam composition and
(b) the reaction product of
   (i) an alkylalkoxysilane; and
   (ii) a silicone condensation cure catalyst wherein said antifoam is encapsulated by said reaction product.

The present invention additionally provides for an antifoam composition encapsulated by the reaction product of
(a) an alkylalkoxysilane; and
(b) a silicone condensation cure catalyst wherein said antifoam is encapsulated by said reaction product, as well as a laundry detergent comprising the encapsulated antifoam composition.

The method of the present invention also provides for a method for delivering an antifoam composition to the rinse cycle of a washing machine comprising:
(a) preparing the encapsulated antifoam composition of claim 1;
(b) preparing a detergent composition comprising said encapsulated antifoam composition; and
(c) adding said detergent composition to a washing machine.

The antifoam compositions utilized by the present invention comprise:
(a) a polyorganosiloxane having a viscosity ranging from about 5 to about 600,000 centistokes at 25° C.;
(b) a silicone resin having the formula:
   $M_w D_x T_y Q_z$ where
   $M = R^1 R^2 R^3 SiO_{1/2}$,
   $D = R^4 R^5 SiO_{2/2}$,
   $T = R^6 SiO_{3/2}$, and
   $Q = SiO_{4/2}$ where $R^1$, $R^2$, $R^3$, $R^4$, $R^5$ and $R^6$ are each independently selected from the group consisting of one to forty carbon atom monovalent saturated hydrocarbon radicals, one to forty carbon atom monovalent unsaturated hydrocarbon radicals, one to forty carbon atom monovalent aromatic hydrocarbon radicals, trifluoropropyl and hydrogen, where the subscripts w and z are positive numbers having a ratio ranging from 0.55 to 1.20 and the subscripts x and y are zero or greater;
(c) a hydrophobing agent; and
(d) a dispersible particulate filler having a BET surface area ranging from about 10 to about 1,000 m$^2$/g wherein said filler has been treated to render said filler hydrophobic;
(e) from about 5 to about 60 weight percent of a silicone polyether copolymer having the formula: $MD_f D'_g M$ where M and D are independently as previously defined, and D' defined as follows:
   $D' = R^4 R^9 SiO_{2/2}$,
where $R^9 = (C_3H_6O)_h(C_2H_4O)_j R_1$, $R^4$ is independently selected as previously defined and where the subscripts f and g each range from 0 to about 35 subject to the limitation that the sum of f and g is at least 5 and not greater than 50 and the subscripts h and j are zero or a positive number subject to the limitation that the sum of h and j is at least 1 and $R^1$ independently selected as previously defined.

BRIEF DESCRIPTION OF THE SEVERAL VIEWS OF THE DRAWING

Not Applicable

DETAILED DESCRIPTION OF THE INVENTION

An effective laundry detergent must control the suds to a certain level during the wash cycle and must provide a means of destroying the sudsing action during the rinse cycle. By encapsulating an antifoam emulsion for a laundry detergent composition, a delivery system for delivery of the antifoam is prepared that allows for control of suds during the wash cycle and the essential elimination of suds during the rinse cycle. The encapsulation of the antifoam emulsion is particularly effective at preventing segregation of the detergent from the antifoam, i.e. settling out is minimized.

Encapsulation of an antifoam emulsion provides a method of stabilizing detergent antifoam compositions. When the detergent containing an encapsulated antifoam is introduced into the washing machine, the mechanical forces of washing rupture some of the encapsulated particles releasing emulsified antifoam, controlling the sudsing action of the detergent. Some of the encapsulated antifoam emulsion is trapped in the weave of the clothes being washed. Because of this entrapment, some of these encapsulated antifoam emulsions survive the wash cycle. The wash water is removed by spinning the clothes and draining the wash water. The mechanical forces of spinning, wringing the clothes dry, rupture the encapsulated antifoam emulsion leaving a residue of antifoam composition on the wet clothes. As water is introduced to the rinse cycle, the antifoam emulsion suppresses suds during the rinse cycle. Subsequent rinse cycles remove the antifoam composition and detergent residues.

The antifoam delivery system of the present invention is prepared by first preparing an antifoam emulsion composition which is emulsified in water. To this aqueous emulsion is added an alkylalkoxysilane that is soluble in the oily antifoam phase of the emulsion. Because the alkylalkoxysilane will undergo a condensation polymerization in the presence of water, the fraction of the alkylalkoxysilane that migrates to the phase boundary between the oil emulsion droplets and the continuous aqueous phase reacts undergoing a condensation polymerization and creating a crosslinked organopolysiloxane shell around the droplet of the oily phase, i.e. the antifoam composition.

The antifoam composition that constitutes the hydrophobic phase of the antifoam emulsion is comprised of:

(a) from about 5 to about 100 weight percent, preferably from about 20 to about 80 weight percent, more preferably from about 30 to about 70 weight percent, and most preferably from about 40 to about 60 weight percent of a polyorganosiloxane having a viscosity of about 5 to about 600,000 centistokes at 25° C., preferably from about 50 to about 100,000 centistokes, more preferably from about 100 to about 60,000 centistokes, and most preferably from about 100 to about 10,000 centistokes;

(b) from about 0.5 to about 40 weight percent, preferably from about 0.5 to about 30 weight percent, more preferably from about 0.5 to about 20 weight percent, and most preferably from about 0.5 to about 10 weight percent of a silicone resin comprising the formula: $M_w D_x T_y Q_z$ where
$M = R^1 R^2 R^3 SiO_{1/2}$,
$D = R^4 R^5 SiO_{2/2}$,
$T = R^6 SiO_{3/2}$, and
$Q = SiO_{4/2}$ where $R^1$, $R^2$, $R^3$, $R^4$, $R^5$ and $R^6$ are each independently selected from the group consisting of one to forty carbon atom saturated, unsaturated and aromatic monovalent hydrocarbon radicals, hydrogen and trifluoropropyl, preferably from the group consisting of one to twenty carbon atom saturated and unsaturated monovalent hydrocarbon radicals, hydrogen and trifluoropropyl, more preferably from the group consisting of one to ten carbon atom saturated and unsaturated monovalent hydrocarbon radicals, hydrogen and trifluoropropyl, and most preferably from the group consisting of methyl, hydrogen and trifluoropropyl where the subscripts w and z are positive numbers having a ratio ranging from 0.55 to 1.20, preferably from 0.60 to 10, more preferably from 0.75 to 1.10 and most preferably from 0.75 to 1.05 and the subscripts x and y are zero or greater; the resin has a viscosity ranging from about 100 to about 600,000 centistokes at 25° C., preferably from about 100 to about 10,000 centistokes, more preferably from about 200 to about 4,000 centistokes, and most preferably from about 300 to about 700 centistokes;

(c) from about 0 to about 40 weight percent, preferably from about 0 to about 30 weight percent, more preferably from about 5 to about 20 weight percent, and most preferably from about 5 to about 15 weight percent of hydrophobing agent. By hydrophobing agent, Applicants functionally define a compound that renders a hydrophilic surface hydrophobic. While not limited to this group, common hydrophobing agents may be selected from the group consisting of silanes, $R^1_a SiX_{4-a}$, where $R^1$ is independently as previously defined, X is a halogen selected from the group consisting of F, Cl, Br and I and a is a subscript having values ranging from 1 to 3, cyclic siloxanes having the formula $D_n$, where D is independently as previously defined and n preferably has values ranging from 3 to 6, and silazanes having the formula: $R^1 R^2 R^3 SiHNSiR^4 R^5 R^6$, where $R^1$, $R^2$, $R^3$, $R^4$, $R^5$ and $R^6$ are independently selected as previously defined. Particularly preferred hydrophobing agents are hexamethyldisilazane and octamethyltetracyclosiloxane.

(d) from about 0.5 to about 50 weight percent, preferably from about 0.5 to about 45 weight percent, more preferably from about 2 to about 35 weight percent, and most preferably from about 2 to about 25 weight percent of a particulate, dispersible filler that has been treated to render it hydrophobic and has a BET surface area ranging from 10 to 1,000 m2/g. Examples of such particulate dispersible fillers include, but are not limited to, silica, precipitated silica, fumed silica, alumina, titania, zirconium silicate, aluminum silicate, mica, and sand. In the compositions of the present invention these materials are used in a size ranging from about 0.001 μm to about 5,000 μm, preferably from about 0.010 μm to about 500 μm, more preferably from about 0.100 μm to about 50 μm, and most preferably from about 0.100 μm to about 20 μm microns.

(e) from about 5 to about 60 weight percent, preferably from about 5 to about 50 weight percent, more preferably from about 10 to about 40 weight percent and most preferably from about 15 to about 30 weight percent of a silicone polyether copolymer having the formula: $MD_f D'_g M$ where M and D are independently as previously defined, and D'defined as follows:
$D' = R^4 R^9 SiO_{2/2}$,
where $R^9 = (C_3H_6O)_h (C_2H_4O)_j$ $R^1$, $R^4$ is independently selected as previously defined and where the subscripts f and g each range from 0 to about 35 subject to the limitation that the sum is at least 5 and not greater than 50 and the subscripts h and j are zero or a positive number subject to the limitation that the sum of h and j is at least 1.

The antifoam composition made up from components (a) through (e) is emulsified by (A) adding from about 0.5 to about 70 parts by weight, preferably from about 0.5 to about 60 parts by weight, more preferably from about 0.5 to about 50 parts by weight, and most preferably from about 0.5 to about 35 parts by weight of the antifoam composition; and (B) adding from about 0.5 to about 40 parts by weight, preferably from about 0.5 to about 30 parts by weight, more preferably from about 0.5 to about 25 parts by weight, and most preferably from about 0.5 to about 20 parts by weight of an emulsifier or mixture of emulsifiers having a hydrophilic lipophilic balance (HLB) ratio of from about 7 to about 16, preferably from about 7 to about 14, more preferably from about 7 to about 12, and most preferably from about 8 to about 12. Thereby preparing an antifoam emulsion wherein the particle size ranges from about 1 micron to about 100 microns.

The antifoam emulsion is encapsulated by adding a small quantity of an alkylalkoxysilane to the antifoam emulsion along with a condensation catalyst. Thus the encapsulated antifoam emulsion may be prepared by (1) adding from about 0.0001 to about 60 parts by weight, preferably from about 0.0001 to about 50 parts by weight, more preferably from about 0.0001 to about 30 parts by weight, and most preferably from about 0.0001 to about 25 parts by weight of an alkylalkoxysilane or mixture of alkylalkoxysilanes having the formula:

$R^7{}_a Si(OR^8)_{4-a}$ where for pure compounds a is an integer ranging from zero to two and for mixtures the average value of a ranges from about 0.5 to about 2, preferably from about 0.8 to about 1.5, more preferably from about 0.9 to about 1.3, and most preferably from about 0.9 to about 1.1 and both $R^7$ and $R^8$ are independently one to eighteen carbon atom monovalent hydrocarbon radicals or alternatively independently selected from $R^1$ and $R^2$ respectively; and (2) from about 0.5 to about 100 parts by weight, preferably from about 0.5 to about 100 parts by weight, more preferably from about 20 to about 100 parts by weight, and most preferably from about 50 to about 100 parts by weight of an aqueous antifoam emulsion; heating to 65°–75° C. and adding thereto;

(3) from about 0.0001 to about 40 parts by weight, preferably from about 0.0001 to about 20 parts by weight, more preferably from about 0.0001 to about 15 parts by weight, and most preferably from about 0.0001 to about 10 parts by weight of a silicone condensation cure catalyst. The silicone condensation cure catalyst is preferably selected from the group consisting of dibutyltin diacetate, aqueous triethanolamine, and aqueous ammonium hydroxide. It is more preferred to use either the triethanolamine or the ammonium hydroxide as a catalyst. Applicants note that the reaction temperature of the encapsulation is not critical if reaction speed is unimportant. Preparation of the encapsulated antifoam is more convenient if the reaction temperature is a temperature above room temperature. Applicants further note that the condensation catalyst is oil soluble and it may appropriately be added anywhere in the preparative steps where it will dissolve in the oily silicone phase and remain there.

The following examples are intended to illustrate the present invention and are not to be construed as limiting the appended claims. All United States patents referenced herein are herewith and hereby specifically incorporated by reference.

EXAMPLES

Preparation of Antifoam Composition

To a metal beaker was charged 156 of grams of a polydimethylsiloxane having a viscosity of 1000 centistokes at 25° C., 75 g of a silicone surfactant having the formula $MD_{20}D'_3M$ where M and D are defined as previously with all the various $R'''$'s methyl and D' with $R^4$ and $R^5$ a radical derived from a mixed oligomer of ethylene oxide and propylene oxide, 31 g of an MQ resin having a viscosity of 500±200 centistokes at 25° C., 25 g of hexamethyldisilazane and 63 g of hydrophobically treated precipitated silica. The beaker was heated to 95° C. and maintained at that temperature for three hours. Preparation of Antifoam Emulsion To a metal beaker was charged 300 g of the antifoam composition, 83.1 g of sorbitan mono-oleate (available commercially as SPAN-80®), and 20 g of polyoxyethylene (20) sorbitan mono-oleate (available commercially as TWEEN-80®). 570 g of de-ionized water was added dropwise through an addition funnel with mixing. This procedure resulted in an emulsion of the antifoam. Encapsulation of the Antifoam Emulsion The encapsulation was accomplished by polycondensation of an alkylalkoxysilane around the antifoam emulsion particles. To a metal beaker was charged 204 g of the antifoam emulsion along with 0.025 g of methyl trimethoxysilane (both $R^7$ and $R^8$ methyl). The mixture was mixed thoroughly and heated to 65°–75° C., followed by the addition of 0.01 g dibutyltindiacetate condensation catalyst. Antifoam Performance Test The performance of the antifoam was measured by the following test:

1) weigh out 0.16 g of detergent that contains about 500 ppm antifoam composition in a 250 mL graduated cylinder and add 100.0 g of de-ionized water to the cylinder;

2) after sealing the graduated cylinder, clamp the graduated cylinder in a horizontal position to a Burrell Wrist Action mechanical shaker (available from Burrell Corp., Pittsburgh, PA);

3) shake the cylinder for 30 seconds at a machine setting of 10;

4) remove the cylinder from the machine and record the foam height every 30 seconds for five minutes. Evaluations Two different detergents were used in evaluating the antifoam and encapsulated antifoam, detergents A and B. Detergent A was supplied by the Proctor & Gamble Company and detergent B was supplied by lever Brothers.

TABLE 1

Foam Volume of Volumetrically Standardized Solutions of Detergent

| A Time (min.) | Detergent A without antifoam | Detergent A with 638 ppm antifoam (non-encapsulated) | Detergent A with 841 ppm encapsulated antifoam |
|---|---|---|---|
| 0.5 | >200[1] | 40 | 24 |
| 1.0 | >200 | 40 | 24 |
| 1.5 | >200 | 40 | 24 |
| 2.0 | >200 | 40 | 24 |
| 2.5 | >200 | 40 | 24 |
| 3.0 | >200 | 40 | 24 |
| 3.5 | >200 | 38 | 24 |
| 4.0 | >200 | 38 | 24 |
| 4.5 | >200 | 38 | 24 |
| 5.0 | >200 | 38 | 24 |

Notes:
[1] The foam filled up to the top of the graduate cylinder, approximately read as 200 mL.

The detergent base alone without any antifoam exhibited a foam volume that reached the top of the cylinder. The foam volume could be significantly reduced by adding antifoam. The volume was further reduced over the addition of the antifoam by adding encapsulated antifoam.

TABLE 2

Foam Volume of Volumetrically Standardized Solutions of Detergent

| B Time (min.) | Detergent A without antifoam | Detergent A with 502 ppm encapsulated antifoam |
|---|---|---|
| 0.5 | >200[1] | 16 |
| 1.0 | >200 | 15 |

TABLE 2-continued

Foam Volume of Volumetrically Standardized Solutions of Detergent

| B Time (min.) | Detergent A without antifoam | Detergent A with 502 ppm encapsulated antifoam |
|---|---|---|
| 1.5 | >200 | 15 |
| 2.0 | >200 | 15 |

Notes:
[1]The foam filled up to the top of the graduate cylinder, approximately read as 200 mL.

Commercial Washing Machine Test

Two commercial washing machines were used to perform the tests. Comparisons were made against a commercially available antifoam containing detergent.

TABLE 3

Foam Height During Wash Cycle

| Wash Time (min.) | Detergent A Height (in.) | Detergent A with Encapsulated Antifoam Height (in.) | Control Height (in.) |
|---|---|---|---|
| 1 | 2.00 | 0.75 | 1.25 |
| 3 | 3.00 | 1.50 | 1.75 |
| 5 | 3.00 | 1.62 | 1.86 |
| 7 | 3.50 | 2.25 | 2.00 |
| 9 | 3.63 | 2.50 | 2.00 |
| 11 | 3.75 | 2.25 | 2.25 |
| 13 | 4.00 | 2.12 | 2.50 |

Note:
The control is an antifoam containing detergent obtained from Proctor & Gamble Co.

TABLE 4

Foam Height During Rinse Cycle

| Wash Time (min.) | Detergent A Height (in.) | Detergent A with Encapsulated Antifoam Height (in.) | Control Height (in.) |
|---|---|---|---|
| 1 | 1.00 | 0 | 0 |
| 3 | 1.50 | 0 | 0.25 |
| 5 | 1.88 | 0 | 0.25 |

Note:
The control is an antifoam containing detergent obtained from Proctor & Gamble Co.

Comparison of Tables 3 and 4 shows that encapsulation of the antifoam permits some of the encapsulated antifoam to survive the wash cycle providing antifoam benefits in the rinse cycle.

Claims:

1. A method for preparing an encapsulated antifoam composition comprising:
   (a) preparing an aqueous emulsion comprising:
      (i) an antifoam composition and
      (ii) an alkylalkoxysilane; and
   (b) adding to said aqueous emulsion a silicone condensation cure catalyst whereby said antifoam composition is encapsulated by the reaction product of said alkylalkoxysilane and said silicone condensation cure catalyst.

2. The method of claim 1 wherein said alkylalkoxysilane has the formula: $R^7_a Si(OR^8)_{4-a}$ where $R^7$ and $R^8$ are each independently selected from the group consisting of one to forty carbon atom monovalent saturated hydrocarbon radicals, one to forty carbon atom monovalent unsaturated hydrocarbon radicals, one to forty carbon atom monovalent aromatic hydrocarbon radicals, trifluoropropyl and hydrogen where the subscript a is a number ranging from about 0.5 to about 2.

3. The method of claim 2 wherein said silicone condensation cure catalyst is selected from the group consisting of dibutyl tin diacetate, aqueous triethanolamine and ammonium hydroxide.

4. The method of claim 3 wherein said antifoam composition comprises:
   (a) a polyorganosiloxane having a viscosity ranging from about 5 to about 600,000 centistokes at 25° C.;
   (b) a silicone resin having the formula:
      $M_w D_x T_y Q_z$ where
      $M = R^1 R^2 R^3 SiO_{1/2}$,
      $D = R^4 R^5 SiO_{2/2}$,
      $T = R^6 SiO_{3/2}$, and
      $Q = SiO_{4/2}$ where $R^1$, $R^2$, $R^3$, $R^4$, $R^5$ and $R^6$ are each independently selected from the group consisting of one to forty carbon atom monovalent saturated hydrocarbon radicals, one to forty carbon atom monovalent unsaturated hydrocarbon radicals, one to forty carbon atom monovalent aromatic hydrocarbon radicals, trifluoropropyl and hydrogen, where the subscripts w and z are positive numbers having a ratio ranging from 0.55 to 1.20 and the subscripts x and y are zero or greater;
   (c) a hydrophobing agent; and
   (d) a dispersible particulate filler having a BET surface area ranging from about 10 to about 1,000 m²/g wherein said filler has been treated to render said filler hydrophobic;
   (e) from about 5 to about 60 weight percent, preferably from about 5 to about 50 weight percent, more preferably from about 10 to about 40 weight percent and most preferably from about 15 to about 30 weight percent of a silicone polyether copolymer having the formula: $MD_f D'_g M$ where M and D are independently as previously defined, and D' defined as follows:
      $D' = R^4 R^9 SiO_{2/2}$,
   where $R^9 = (C_3 H_6 O)_h (C_2 H_4 O)_j$, $R^1$, $R^4$ is independently selected as previously defined and where the subscripts f and g each range from 0 to about 35 subject to the limitation that the sum is at least 5 and not greater than 50 and the subscripts h and j are zero or a positive number subject to the limitation that the sum of h and j is at least 1 and $R^1$ independently selected as previously defined.

5. The method of claim 4 wherein said hydrophobing agent is selected from the group consisting of silanes, cyclic siloxanes and silazanes.

6. The method of claim 5 wherein said dispersible particulate filler is selected from the group consisting of silica, precipitated silica, fumed silica, alumina, titania, zirconium silicate, aluminum silicate, mica, and sand.

7. The method of claim 6 wherein said dispersible particulate filler comprises precipitated silica and fumed silica.

8. The method of claim 7 wherein said aqueous emulsion comprises an emulsifier having a hydrophilic lipophilic balance ratio ranging from about 7 to about 16.

9. An encapsulated antifoam composition comprising:
   (a) an aqueous emulsion comprising an antifoam composition and
   (b) the reaction product of (i) an alkylalkoxysilane; and
(ii) a silicone condensation cure catalyst wherein said antifoam is encapsulated by said reaction product.

10. The composition of claim 9 wherein said alkylalkoxysilane has the formula:

$R^7_a Si(OR^8)_{4-a}$ where $R^7$ and $R^8$ are each independently selected from the group consisting of one to forty carbon atom monovalent saturated hydrocarbon radicals, one to forty carbon atom monovalent unsaturated hydrocarbon radicals, one to forty carbon atom monovalent aromatic hydrocarbon radicals, trifluoropropyl and hydrogen where the subscript a is a number ranging from about 0.5 to about 2.

11. The composition of claim 10 wherein said silicone condensation cure catalyst is selected from the group consisting of dibutyl tin diacetate, aqueous triethanolamine and ammonium hydroxide.

12. The composition of claim 11 wherein said antifoam composition comprises:

(a) a polyorganosiloxane having a viscosity ranging from about 5 to about 600,000 centistokes at 25° C.;

(b) a silicone resin having the formula:
$M_w D_x T_y Q_z$ where
$M = R^1 R^2 R^3 SiO_{1/2}$,
$D = R^4 R^5 SiO_{2/2}$,
$T = R^6 SiO_{3/2}$, and $Q = SiO_{4/2}$ where $R^1$, $R^2$, $R^3$, $R^4$, $R^5$ and $R^6$ are each independently selected from the group consisting of one to forty carbon atom monovalent saturated hydrocarbon radicals, one to forty carbon atom monovalent unsaturated hydrocarbon radicals, one to forty carbon atom monovalent aromatic hydrocarbon radicals, trifluoropropyl and hydrogen, where the subscripts w and z are positive numbers having a ratio ranging from 0.55 to 1.20 and the subscripts x and y are zero or greater;

(c) a hydrophobing agent;

(d) a dispersible particulate filler having a BET surface area ranging from about 10 to about 1,000 m²/g wherein said filler has been treated to render said filler hydrophobic; and (e) from about 5 to about 60 weight percent, preferably from about 5 to about 50 weight percent, more preferably from about 10 to about 40 weight percent and most preferably from about 15 to about 30 weight percent of a silicone polyether copolymer having the formula: $MD_f D'_g M$ where M and D are independently as previously defined, and D' defined as follows:

$D' = R^4 R^9 SiO_{2/2}$, where $R^9 = (C_3H_6O)_h(C_2H_4O)_j$, $R^1$, $R^4$ is independently selected as previously defined and where the subscripts f and g each range from 0 to about 35 subject to the limitation that the sum is at least 5 and not greater than 50 and the subscripts h and j are zero or a positive number subject to the limitation that the sum of h and j is at least 1 and $R^1$ independently selected as previously defined.

13. The composition of claim 12 wherein said hydrophobing agent is selected from the group consisting of silanes, cyclic siloxanes and silazanes.

14. The composition of claim 13 wherein said dispersible particulate filler is selected from the group consisting of silica, precipitated silica, fumed silica, alumina, titania, zirconium silicate, aluminum silicate, mica, and sand.

15. The composition of claim 14 wherein said dispersible particulate filler comprises precipitated silica and fumed silica.

16. The composition of claim 15 wherein said aqueous emulsion comprises an emulsifier having a hydrophilic lipophilic balance ratio ranging from about 7 to about 16.

17. A composition produced by the method of claim 1.

18. An antifoam composition encapsulated by the reaction product of (a) an alkylalkoxysilane; and (b) a silicone condensation cure catalyst wherein said antifoam is encapsulated by said reaction product.

19. A laundry detergent comprising the encapsulated antifoam composition of claim 18.

20. A method for delivering an antifoam composition to the rinse cycle of a washing machine comprising:

(a) preparing the encapsulated antifoam composition of claim 1;

(b) preparing a detergent composition comprising said encapsulated antifoam composition; and (c) adding said detergent composition to a washing machine.

* * * * *